United States Patent
Kottari et al.

(10) Patent No.: US 12,053,766 B2
(45) Date of Patent: Aug. 6, 2024

(54) ORGANOMETALLIC COMPOUND FOR HYDROCARBON CRACKING

(71) Applicant: Hindustan Petroleum Corporation Limited, Bangalore (IN)

(72) Inventors: Naresh Kottari, Bangalore (IN); Kanuparthy Naga Raja, Bangalore (IN); Chintalapati Siva Kesava Raju, Bangalore (IN); Satyanarayana Murty Pudi, Bangalore (IN); Bhavesh Sharma, Bangalore (IN); Ramkumar Mangala, Bangalore (IN); Peddy Venkat Chalapathi Rao, Bangalore (IN); Nettam Venkateswarlu Choudary, Bangalore (IN); Gandham Sriganesh, Bangalore (IN)

(73) Assignee: HINDUSTAN PETROLEUM CORPORATION LIMITED, Bangalore (IN)

(*) Notice: Subject to any disclaimer, the term of this patent is extended or adjusted under 35 U.S.C. 154(b) by 715 days.

(21) Appl. No.: 17/277,700

(22) PCT Filed: Sep. 18, 2019

(86) PCT No.: PCT/IN2019/050685
§ 371 (c)(1),
(2) Date: Mar. 18, 2021

(87) PCT Pub. No.: WO2020/058990
PCT Pub. Date: Mar. 26, 2020

(65) Prior Publication Data
US 2021/0339235 A1 Nov. 4, 2021

(30) Foreign Application Priority Data
Sep. 18, 2018 (IN) .............................. 201841035176

(51) Int. Cl.
*B01J 31/22* (2006.01)
*B01J 37/04* (2006.01)
*C07F 11/00* (2006.01)
*C10G 11/02* (2006.01)

(52) U.S. Cl.
CPC ....... *B01J 31/2226* (2013.01); *B01J 31/2213* (2013.01); *B01J 37/04* (2013.01); *C07F 11/005* (2013.01); *C10G 11/02* (2013.01); *B01J 2231/646* (2013.01); *B01J 2531/64* (2013.01)

(58) Field of Classification Search
CPC ... C07F 11/005; B01J 2531/64; B01J 31/2213
See application file for complete search history.

(56) References Cited

U.S. PATENT DOCUMENTS

| | | | |
|---|---|---|---|
| 7,670,984 B2 | 3/2010 | Wu et al. | |
| 8,097,149 B2 | 1/2012 | Wu et al. | |
| 8,183,335 B2* | 5/2012 | Maliverney | C08K 5/56 528/14 |
| 2006/0199745 A1 | 9/2006 | Tynik et al. | |
| 2017/0128929 A1 | 5/2017 | Kumar et al. | |

FOREIGN PATENT DOCUMENTS

| | | | |
|---|---|---|---|
| DE | 4432795 A1 * | 3/1996 | .......... B01J 31/0237 |
| EP | 2864042 | 12/2013 | |
| EP | 2937404 A1 | 10/2015 | |
| WO | WO-00/27781 A1 | 5/2000 | |
| WO | 2014199389 A1 | 12/2014 | |

OTHER PUBLICATIONS

P. Dabas, et.al. 9(3) Asian Journal of Chemistry 457-461 (1997) (Year: 1997).*
Indian Examination Report for Indian Application No. 201841035176, dated Mar. 31, 2021, 6 pgs.
T. S. Piper, et al., "Alkyl and Aryl Derivatives of 90 -Cyclopetadienyl Compounds of Chromium, Molybdenum, Tungsten, and Iron", J. Inorg. Nucl. Chem., vol. 3, 1956, pp. 104-124.

* cited by examiner

*Primary Examiner* — Alexander R Pagano
*Assistant Examiner* — Frank S. Hou
(74) *Attorney, Agent, or Firm* — BLANK ROME LLP

(57) ABSTRACT

The instant disclosure provides an organometallic compound of Formula I:

$$(O)_{3-n-m}M{\genfrac{}{}{0pt}{}{(OR_1)_m}{(OR)_n}}$$

$$(O)_{3-((m+n)/2)}M{\genfrac{}{}{0pt}{}{(OR_1)_m}{(OR)_n}},$$

Formula I wherein R is selected from $-C_{1-10}$ alkyl or $-C(O)C_{1-10}$ alkyl; $R_1$ is selected from $-C_{1-10}$ alkyl, $-C(O)C_{1-10}$ alkyl, $-C(O)C_{1-10}$ alkylN$^+$R$_a$R$_b$Cl$^-$, $-C(O)C_{1-10}$ alkylN(CO)R$_a$, $-C_{1-10}$ alkylN$^+$R$_a$R$_b$Cl—, or $-C_{1-10}$ alkylN(CO)R$_a$, wherein R$_a$ and R$_b$ is independently selected from H, $C_{6-12}$ aryl, $C_{1-10}$ alkyl, $C_{6-12}$ aryl, or $C_{1-10}$ alkyl; R, and R$_1$ can be taken together to form a monocyclic 6-8 membered ring; M is selected from Group VI-B metals; and m and n is independently 1 to 3. A process for obtaining the organometallic compound is also provided.

4 Claims, 2 Drawing Sheets

ORGANOMETALLIC COMPOUND FOR HYDROCARBON CRACKING

RELATED APPLICATIONS

This application is a national phase of PCT/IN2019/050685, filed on Sep. 18, 2019, which claims priority to Indian Application No. 201841035176, filed on Sep. 18, 2018. The entire contents of these applications are hereby incorporated by reference.

FIELD OF THE INVENTION

The present disclosure generally relates to the oil and gas industry, and in particular to catalysts for resid upgradation.

BACKGROUND OF THE INVENTION

Post the thermo-chemical cracking process, the highly valuable low boiling fractions of petroleum crude including gasoline are distilled out in refineries. After the fractional distillation (separation) of heavier fractions such as naphtha, the remaining residue has a high hydrocarbon-content and is considered as a low-value stream. The resid stream comprises components such as vacuum gas oil and asphaltenes which find limited direct application as a fuel owing to their high polluting nature and low calorific value. This residual or resid stream typically contains fractions that have high kinematic viscosities (even greater than 50 mm$^2$/s at 100° C.). In light of the looming energy-crisis, requirement of energy-rich fuels is of utmost need. Hence, in spite of it being energy and cost-intensive, the resid-upgradation process is routinely employed to recover valuable low-boiling fractions.

WO2014199389 reveals a process for resid-upgradation that is capable of providing enhanced efficacy in terms of conversion of high boiling point olefin feedstock to economically useful low boiling fractions. The method is carried out in the presence of molybdenum salts such as carboxylates. In order to bring down production costs and also to make the resid-upgradation process more efficient, catalysts have been researched extensively. US20170128929 reveals nano-sized iron particles that are used for a process of resid-upgradation. EP2864042 reveals a titania-based catalyst that is primarily able to reduce sulfur content of resid feedstock.

Such catalysts, however, are known to suffer from drawbacks of inefficient conversion due to high decomposition temperature. An ideal catalyst would hence need to have a decomposition temperature that falls within the range of the boiling point of the hydrocarbon feedstock.

SUMMARY OF THE INVENTION

In an aspect of the present disclosure, there is provided an organometallic compound of Formula I:

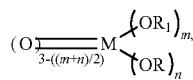

Formula I wherein R is selected from —$C_{1-10}$ alkyl or —$C(O)C_{1-10}$ alkyl;

$R_1$ is selected from —$C_{1-10}$ alkyl, —$C(O)C_{1-10}$ alkyl, —$C(O)C_{1-10}$ alkylN$^+$R$_a$R$_b$Cl$^-$, —$C(O)C_{1-10}$ alkylN(CO)R$_a$, —$C_{1-10}$ alkylN$^+$R$_a$R$_b$Cl$^-$, or —$C_{1-10}$ alkylN(CO)R$_a$, wherein R$_a$, and R$_b$ is independently selected from H, $C_{6-12}$ aryl, $C_{1-10}$ alkyl, $C_{6-12}$ aryl, or $C_{1-10}$ alkyl;

R, and $R_1$ can be taken together to form a monocyclic 6-8 membered ring;

M is selected from Group VI-B metals and m and n is independently 1 to 3.

In an aspect of the present disclosure, there is provided a process of preparation of the organometallic compound of Formula I, said process comprising: (a) obtaining at least one metal precursor; (b) contacting the metal precursor with at least one first additive to obtain a first mixture; (c) optionally contacting first mixture with at least one second additive to obtain second mixture; and (d) processing the first mixture or the second mixture to obtain the organometallic compound.

These and other features, aspects, and advantages of the present subject matter will be better understood with reference to the following description and appended claims. This summary is provided to introduce a selection of concepts in a simplified form. This summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION OF THE INVENTION

Figure 1:
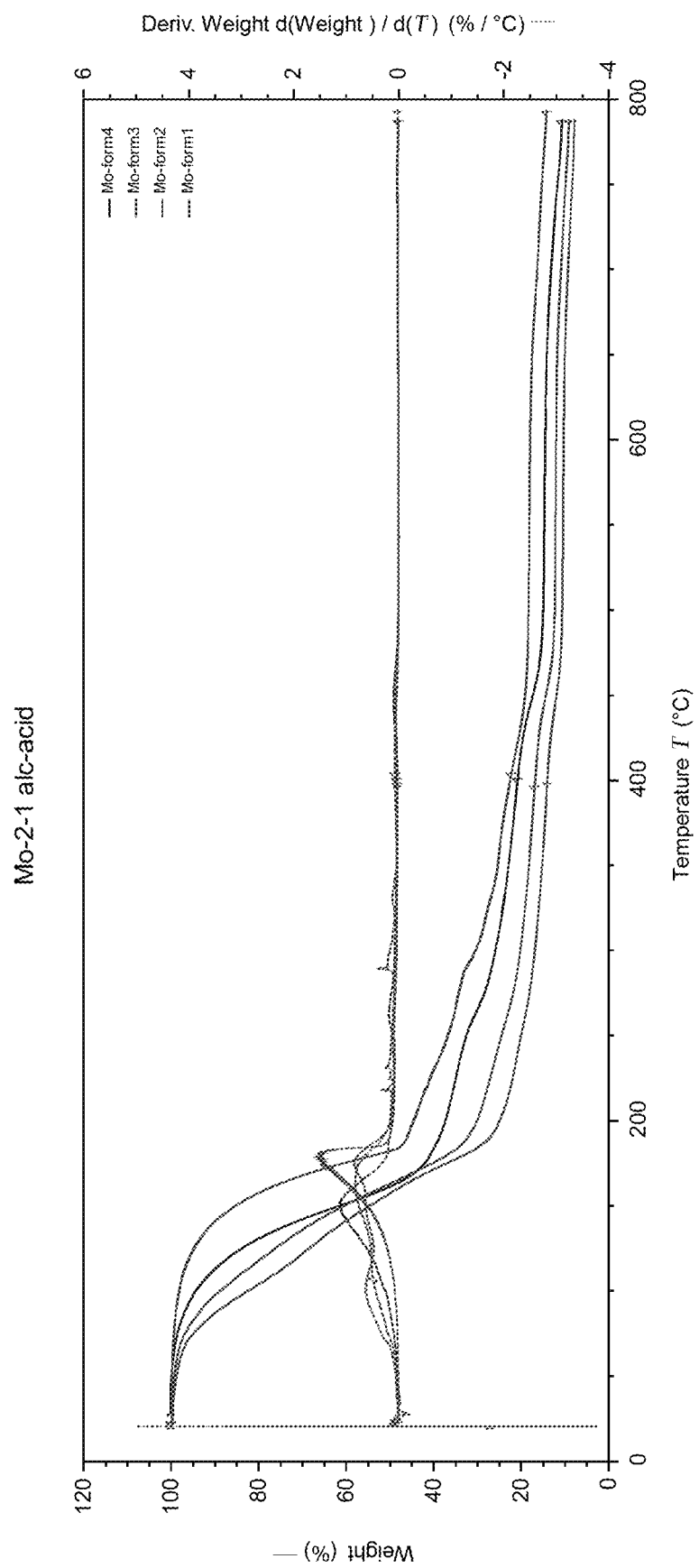
FIG. 1 depicts the thermogravimetric analysis (TGA) spectrum of an organometallic compound, in accordance with an implementation of the present subject matter.

Those skilled in the art will be aware that the present disclosure is subject to variations and modifications other than those specifically described. It is to be understood that the present disclosure includes all such variations and modifications. The disclosure also includes all such steps, features, compositions and compounds referred to or indicated in this specification, individually or collectively, and any and all combinations of any or more of such steps or features.

Definitions

For convenience, before further description of the present disclosure, certain terms employed in the specification, and examples are collected here. These definitions should be read in the light of the remainder of the disclosure and understood as by a person of skill in the art. The terms used herein have the meanings recognized and known to those of skill in the art, however, for convenience and completeness, particular terms and their meanings are set forth below.

The articles "a", "an" and "the" are used to refer to one or to more than one (i.e., to at least one) of the grammatical object of the article.

The terms "comprise" and "comprising" are used in the inclusive, open sense, meaning that additional elements may be included. It is not intended to be construed as "consists of only".

Throughout this specification, unless the context requires otherwise the word "comprise", and variations such as "comprises" and "comprising", will be understood to imply the inclusion of a stated element or step or group of element or steps but not the exclusion of any other element or steps.

The term "including" is used to mean "including but not limited to", "including" and "including but not limited to" are used interchangeably.

Unless defined otherwise, all technical and scientific terms used herein have the same meaning as commonly understood to one of ordinary skill in the art to which this disclosure belongs. Although methods and materials similar or equivalent to those described herein can be used in the practice or testing of the disclosure, the preferred methods, and materials are now described. All publications mentioned herein are incorporated herein by reference.

Ratios, concentrations, amounts, and other numerical data may be presented herein in a range format. It is to be understood that such range format is used merely for convenience and brevity and should be interpreted flexibly to include not only the numerical values explicitly recited as the limits of the range but also to include all the individual numerical values or sub-ranges encompassed within that range as if each numerical value and sub-range is explicitly recited. For example, a temperature range of about 150° C. to about 220° C. should be interpreted to include not only the explicitly recited limits of about 150° C. to about 220° C., but also to include sub-ranges, such as 150° C. to 115° C., 155° C. to 220° C., and so forth, as well as individual amounts, including fractional amounts, within the specified ranges, such as 150.5° C., 219.1° C., and 170.9° C., for example.

The present disclosure is not to be limited in scope by the specific embodiments described herein, which are intended for the purposes of exemplification only. Functionally equivalent products, compositions, and methods are clearly within scope of the disclosure, as described herein.

As mentioned in the Background section, an ideal catalyst for cracking hydrocarbons should have a decomposition temperature that is within the boiling point of the hydrocarbon feedstock. However, since cracking can be performed on a range of hydrocarbon feedstocks (differing in boiling points), the development of catalyst moieties that allow tunability of decomposition temperature is highly sought after. In accordance, the present disclosure provides a molybdenum-based organometallic compound that provides control over its decomposition temperature.

In an embodiment of the present disclosure, there is provided an organometallic compound of Formula I:

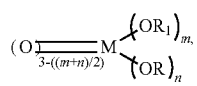

Formula I wherein R is selected from —$C_{1\text{-}10}$ alkyl or —$C(O)C_{1\text{-}10}$ alkyl; $R_1$ is selected from —$C_{1\text{-}10}$ alkyl, —$C(O)C_{1\text{-}10}$ alkyl, —$C(O)C_{1\text{-}10}$ alkylN$^+$R$_a$R$_b$Cl$^-$, —$C(O)C_{1\text{-}10}$ alkylN(CO)R$_a$, —$C_{1\text{-}10}$ alkylN$^+$R$_a$R$_b$Cl—, or —$C_{1\text{-}10}$ alkylN(CO)R$_a$, wherein R$_a$, and R$_b$ is independently selected from H, $C_{6\text{-}12}$ aryl, $C_{1\text{-}10}$ alkyl, $C_{6\text{-}12}$ aryl, or $C_{1\text{-}10}$ alkyl; R, and $R_1$ can be taken together to form a monocyclic 6-8 membered ring; M is selected from Group VI-B metals and m and n is independently 1 to 3. In another embodiment of the present disclosure, R is selected from —$C_{2\text{-}9}$ alkyl or —$C(O)C_{2\text{-}9}$ alkyl; $R_1$ is selected from —$C_{2\text{-}9}$ alkyl, —$C(O)C_{2\text{-}9}$ alkyl, —$C(O)C_{2\text{-}9}$alkylN$^+$R$_a$R$_b$Cl$^-$, —$C(O)C_{2\text{-}9}$ alkylN(CO)R$_a$, —$C_{2\text{-}9}$alkylN$^+$R$_a$R$_b$Cl$^-$, or —$C_{2\text{-}9}$ alkylN(CO)R$_a$, wherein R$_a$, and R$_b$ is independently selected from H, $C_6$ aryl, $C_{1\text{-}8}$ alkyl, $C_6$ aryl, or $C_{1\text{-}8}$ alkyl; R, and $R_1$ can be taken together to form a monocyclic 6-8 membered ring; M is selected from Group VI-B metals and m and n is independently 1 to 3. In another embodiment of the present disclosure, n and m together does not exceed 3.

In an embodiment of the present disclosure, there is provided an organometallic compound as described herein, wherein M is selected from Mo, W, or Cr. In another embodiment of the present disclosure, M is selected from Mo or W. In yet another embodiment of the present disclosure, M is Mo. In another alternative embodiment of the present disclosure, M is W.

In an embodiment of the present disclosure, there is provided an organometallic compound of Formula I as described herein, wherein M is selected from Mo, W, or Cr.

In an embodiment of the present disclosure, there is provided an organometallic compound as described herein, wherein R is selected from —$C_{3\text{-}9}$ alkyl or —$C(O)C_{3\text{-}9}$ alkyl; $R_1$ is selected from —$C_{3\text{-}9}$ alkyl, —$C(O)C_{3\text{-}9}$ alkyl, —$C(O)C_{1\text{-}5}$ alkylN$^+$R$_a$R$_b$Cl$^-$, —$C(O)C_{1\text{-}5}$ alkylN(CO)R$_a$, —$C_{1\text{-}5}$ alkylN+R$_a$R$_b$Cl$^-$, or —$C_{1\text{-}5}$ alkylN(CO)R$_a$, and R$_a$, and R$_b$ is independently selected from H, $C_6$ aryl, $C_{1\text{-}5}$ alkyl, $C_6$ aryl, or $C_{1\text{-}5}$ alkyl.

In an embodiment of the present disclosure, there is provided an organometallic compound of Formula I:

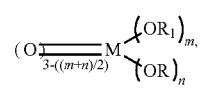

Formula I wherein R is selected from —$C_{3\text{-}9}$ alkyl or —$C(O)C_{3\text{-}9}$ alkyl; $R_1$ is selected from —$C_{3\text{-}9}$ alkyl, —$C(O)C_{3\text{-}9}$ alkyl, —$C(O)C_{1\text{-}5}$ alkylN$^+$R$_a$R$_b$Cl$^-$, —$C(O)C_{1\text{-}5}$ alkylN(CO)R$_a$, —$C_{1\text{-}5}$ alkylN$^+$R$_a$R$_b$Cl—, or —$C_{1\text{-}5}$ alkylN(CO)R$_a$, and R$_a$, and R$_b$ is independently selected from H, $C_6$ aryl, $C_{1\text{-}5}$ alkyl, $C_6$ aryl, or $C_{1\text{-}5}$ alkyl; R, and $R_1$ can be taken together to form a monocyclic 6-8 membered ring; M is selected from Group VI-B metals and m and n is independently 1 to 3.

In an embodiment of the present disclosure, there is provided an organometallic compound of Formula I:

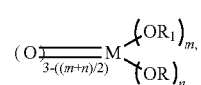

Formula I wherein R is selected from —$C_{3\text{-}9}$ alkyl or —$C(O)C_{3\text{-}9}$ alkyl; $R_1$ is selected from —$C_{3\text{-}9}$ alkyl, —$C(O)C_{3\text{-}9}$ alkyl, —$C(O)C_{1\text{-}5}$ alkylN$^+$R$_a$R$_b$Cl$^-$, —$C(O)C_{1\text{-}5}$ alkylN(CO)R$_a$, —$C_{1\text{-}5}$ alkylN$^+$R$_a$R$_b$Cl$^-$, or —$C_{1\text{-}5}$ alkylN(CO)R$_a$, and R$_a$, and R$_b$ is independently selected from H, $C_6$ aryl, $C_{1\text{-}5}$ alkyl, $C_6$ aryl, or $C_{1\text{-}5}$ alkyl; Mo, W, or Cr and m and n is independently 1 to 3.

In an embodiment of the present disclosure, there is provided an organometallic compound as described herein, wherein m and n are independently varied in order to obtain a decomposition temperature in a range of 180-400° C. for the organometallic compound. In another embodiment of the present disclosure, the decomposition temperature in a range of 220-350° C. for the organometallic compound.

In an embodiment of the present disclosure, there is provided an organometallic compound of Formula I as described herein, wherein m and n are independently varied in order to obtain a decomposition temperature in a range of 180-400° C. for the organometallic compound.

In an embodiment of the present disclosure, there is provided a process of preparation of the organometallic compound comprising: (a) obtaining at least one metal precursor; (b) contacting the metal precursor with at least one first additive to obtain a first mixture; (c) optionally contacting first mixture with at least one second additive to obtain second mixture; and (d) processing the first mixture or the second mixture to obtain the organometallic compound.

In an embodiment of the present disclosure, there is provided a process of preparation of the organometallic compound of Formula I:

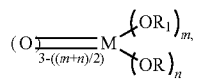

Formula I wherein R is selected from —$C_{1-10}$ alkyl or —$C(O)C_{1-10}$ alkyl; $R_1$ is selected from —$C_{1-10}$ alkyl, —$C(O)C_{1-10}$ alkyl, —$C(O)C_{1-10}$ alkylN$^+$R$_a$R$_b$Cl$^-$, —$C(O)C_{1-10}$ alkylN(CO)R$_a$, —$C_{1-10}$ alkylN$^+$R$_a$R$_b$Cl$^-$, or —$C_{1-10}$ alkylN(CO)R$_a$, wherein R$_a$, and R$_b$ is independently selected from H, $C_{6-12}$ aryl, $C_{1-10}$ alkyl, $C_{6-12}$ aryl, or $C_{1-10}$ alkyl; R, and $R_1$ can be taken together to form a monocyclic 6-8 membered ring; M is selected from Group VI-B metals and m and n is independently 1 to 3, said process comprising: (a) obtaining at least one metal precursor; (b) contacting the metal precursor with at least one first additive to obtain a first mixture; (c) optionally contacting first mixture with at least one second additive to obtain second mixture; and (d) processing the first mixture or the second mixture to obtain the organometallic compound.

In an embodiment of the present disclosure, there is provided a process of preparation of the organometallic compound as described herein, wherein contacting the metal precursor with at least one first additive is carried out at a temperature in the range of 150-220° C. fora period in the range of 2-14 hours to obtain a first mixture; (c) optionally contacting first mixture with at least one second additive in the range of 150-220° C. for a period in the range of 2-14 hours to obtain second mixture; and (d) processing the first mixture or the second mixture to obtain the organometallic compound. In another embodiment of the present disclosure, contacting the metal precursor with at least one first additive is carried out at a temperature in the range of 160-210° C. for a period in the range of 3-13 hours to obtain a first mixture; (c) optionally contacting first mixture with at least one second additive in the range of 160-200° C. for a period in the range of 3-13 hours to obtain second mixture; and (d) processing the first mixture or the second mixture to obtain the organometallic compound.

In an embodiment of the present disclosure, there is provided a process of preparation of the organometallic compound as described herein, wherein contacting the metal precursor with at least one first additive is carried out at a temperature in the range of 150-220° C. fora period in the range of 2-14 hours to obtain a first mixture; (c) contacting first mixture with at least one second additive in the range of 150-220° C. for a period in the range of 2-14 hours to obtain second mixture; and (d) processing the second mixture to obtain the organometallic compound.

In an embodiment of the present disclosure, there is provided a process of preparation of the organometallic compound as described herein, wherein contacting the metal precursor with at least one first additive is carried out at a temperature in the range of 150-220° C. fora period in the range of 2-14 hours to obtain a first mixture; (c) processing the first mixture to obtain the organometallic compound.

In an embodiment of the present disclosure, there is provided a process of preparation of the organometallic compound as described herein, wherein the at least one metal precursor is selected from molybdic acid, molybdenum trioxide, sodium molybdate, potassium molybdate, ammonium molybdate, calcium molybdate, magnesium molybdate, tungstic acid, sodium tungstate, potassium tungstate, calcium tungstate, magnesium tungstate, and combinations thereof. In another embodiment of the present disclosure, the at least one metal precursor is molybdic acid.

In an embodiment of the present disclosure, there is provided a process of preparation of the organometallic compound as described herein, wherein the at least one first additive, and the at least one second additive are independently selected from, at least one alcohol, or at least one carboxylic acid. In another embodiment ofthe present disclosure, the at least one first additive is at least one alcohol. In yet another embodiment of the present disclosure, the at least one second additive is at least one alcohol. In another alternate embodiment of the present disclosure, the at least one first additive is at least one carboxylic acid. In yet another alternate embodiment of the present disclosure, the at least one second additive is at least one carboxylic acid.

In an embodiment of the present disclosure, there is provided a process of preparation of the organometallic compound as described herein, wherein the at least one alcohol is a compound of Formula II:

HOR

wherein $R_2$ is selected from $C_{1-10}$ alkyl, $C_{1-10}$ alkyl (CO)NR$_a$C$_{1-10}$ alkyl, or $C_{1-10}$ alkyl N$^+$R$_a$R$_b$Cl$^-$C$_{1-10}$ alkyl, wherein $C_{1-10}$ alkyl is optionally substituted with OH or COOH; wherein R$_a$, and R$_b$ is independently selected from H, $C_{6-12}$ aryl $C_{1-10}$ alkyl, $C_{6-12}$ aryl or $C_{1-10}$ alkyl. In another embodiment of the present disclosure, $R_2$ is selected from $C_{1-10}$ alkyl, $C_{1-10}$ alkyl (CO)NR$_a$C$_{1-10}$ alkyl, or $C_{1-10}$ alkyl N$^+$R$_a$R$_b$Cl$^-$C$_{1-10}$ alkyl, wherein $C_{1-10}$ alkyl is optionally substituted with OH or COOH; wherein R$_a$, and R$_b$ is independently selected from H, $C_{6-12}$ aryl, $C_{1-10}$ alkyl, $C_{6-12}$ aryl, or $C_{1-10}$ alkyl.

In an embodiment of the present disclosure, there is provided a process of preparation of the organometallic compound as described herein, wherein the at least one additive is at least one alcohol of Formula II:

HOR

wherein $R_2$ is selected from $C_{1-10}$ alkyl, $C_{1-10}$ alkyl (CO)NR$_a$C$_{1-10}$ alkyl, or $C_{1-10}$ alkyl N$^+$R$_a$R$_b$Cl$^{-1}$C$_{1-10}$ alkyl, wherein $C_{1-10}$ alkyl is optionally substituted with OH or COOH; wherein $R_a$, and $R_b$ is independently selected from H, $C_{6-12}$ aryl, $C_{1-10}$ alkyl, $C_{6-12}$ aryl, or $C_{1-10}$ alkyl.

In an embodiment of the present disclosure, there is provided a process of preparation of the organometallic compound as described herein, wherein the at least one carboxylic acid is a compound of Formula III:

wherein $R_3$ is selected from $C_{1-10}$ alkyl, $C_{1-10}$ alkyl (CO)$NR_aC_{1-10}$ alkyl, or $C_{1-10}$ alkyl $N^+R_aR_bCl^-$ $C_{1-10}$ alkyl, wherein $C_{1-10}$ alkyl is optionally substituted with OH or COOH; wherein $R_a$, and $R_b$ is independently selected from H, $C_{6-12}$ aryl, $C_{1-10}$ alkyl, $C_{6-12}$ aryl, or $C_{1-10}$ alkyl. In another embodiment of the present disclosure, $R_3$ is selected from $C_{1-6}$ alkyl, $C_{1-6}$ alkyl (CO)$NR_aC_{1-6}$ alkyl, or $C_{1-6}$ alkyl $N^+R_aR_bCl^-$ $C_{1-6}$ alkyl, wherein $C_{1-6}$ alkyl is optionally substituted with OH or COOH; wherein $R_a$, and $R_b$ is independently selected from H, $C_6$ aryl, $C_{1-6}$ alkyl, $C_6$ aryl, or $C_{1-6}$ alkyl.

In an embodiment of the present disclosure, there is provided a process of preparation of the organometallic compound as described herein, wherein the at least one additive is at least one carboxylic acid of Formula III:

wherein $R_3$ is selected from $C_{1-10}$ alkyl, $C_{1-10}$ alkyl (CO)$NR_aC_{1-10}$ alkyl, or $C_{1-10}$ alkyl $N^+R_aR_bCl^-$ $C_{1-10}$ alkyl, wherein $C_{1-10}$ alkyl is optionally substituted with OH or COOH; wherein $R_a$, and $R_b$ is independently selected from H, $C_{6-12}$ aryl $C_{1-10}$ alkyl, $C_{6-12}$ aryl aryl, or $C_{1-10}$ alkyl.

In an embodiment of the present disclosure, there is provided a cracking process for obtaining lighter hydrocarbons in the presence of organometallic compound as described herein, said process comprising: (a) obtaining the organometallic compound; (b) contacting the organometallic compound with at least one hydrocarbon feedstock to obtain the lighter hydrocarbons.

In an embodiment of the present disclosure, there is provided a cracking process for obtaining lighter hydrocarbons in the presence of organometallic compound of Formula I:

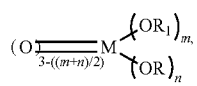

wherein R is selected from —$C_{1-10}$ alkyl or —$C(O)C_{1-10}$ alkyl; $R_1$ is selected from —$C_{1-10}$ alkyl, —$C(O)C_{1-10}$ alkyl, —$C(O)C_{1-10}$ alkylN$^+R_aR_bCl^-$, —$C(O)C_{1-10}$ alkylN(CO)$R_a$, —$C_{1-10}$ alkylN$^+R_aR_bCl^-$, or —$C_{1-10}$ alkylN(CO)$R_a$, wherein $R_a$, and $R_b$ is independently selected from H, $C_{6-12}$ aryl, $C_{1-10}$ alkyl, $C_{6-12}$ aryl, or $C_{1-10}$ alkyl; R, and $R_1$ can be taken together to form a monocyclic 6-8 membered ring; M is selected from Group VI-B metals and m and n is independently 1 to 3, said process comprising: (a) obtaining the organometallic compound; (b) contacting the organometallic compound with at least one hydrocarbon feedstock to obtain the lighter hydrocarbons.

In an embodiment of the present disclosure, there is provided a cracking process as described herein, wherein the hydrocarbon feedstock comprises vacuum residue, atmospheric residue, bitumen, tar sand, FCC slurry, and combinations thereof, and combinations thereof. In another embodiment of the present disclosure, the hydrocarbon feedstock is vacuum residue. In yet another embodiment of the present disclosure, the hydrocarbon feedstock is FCC slurry.

In an embodiment of the present disclosure, there is provided a cracking process for obtaining lighter hydrocarbons in the presence of organometallic compound as described herein, said process comprising: (a) obtaining the organometallic compound; (b) contacting the organometallic compound with at least one hydrocarbon feedstock to obtain the lighter hydrocarbons, wherein the hydrocarbon feedstock comprises vacuum residue, atmospheric residue, bitumen, tar sand, FCC slurry, and combinations thereof, and combinations thereof.

In an embodiment of the present disclosure, there is provided a cracking process as described herein, wherein the lighter hydrocarbons are selected from the group consisting of fuel gas, liquefied petroleum gas, naphtha, gas oil, heavy gas oil, residual oil, coke, and combinations thereof. In another embodiment of the present disclosure, the light olefin is fuel gas. In yet another embodiment of the present disclosure, the light olefin is liquified petroleum gas.

In an embodiment of the present disclosure, there is provided a cracking process for obtaining lighter hydrocarbons in the presence of organometallic compound as described herein, said process comprising: (a) obtaining the organometallic compound; (b) contacting the organometallic compound with at least one hydrocarbon feedstock to obtain the lighter hydrocarbons, wherein the lighter hydrocarbons are selected from the group consisting of fuel gas, liquefied petroleum gas, naphtha, gas oil, heavy gas oil, residual oil, coke, and combinations thereof.

In an embodiment of the present disclosure, there is provided a cracking process as described herein, wherein the hydrocarbon feedstock has a boiling point in the range of 370-750° C. In another embodiment of the present disclosure, the hydrocarbon feedstock has a boiling point in the range of 390-720° C. In another embodiment of the present disclosure, the hydrocarbon feedstock has a boiling point in the range of 410-700° C.

In an embodiment of the present disclosure, there is provided an organometallic compound as described herein, wherein the organometallic compound has a decomposition temperature which is tunable as per the boiling point of the feedstock. The decomposition temperature of the organometallic compound was found to be tunable based on the amount of at least one additive, i.e. least one carboxylic acid and at least one alcohol used.

Although the subject matter has been described in considerable detail with reference to certain preferred embodiments thereof, other embodiments are possible.

EXAMPLES

The disclosure will now be illustrated with working examples, which is intended to illustrate the working of disclosure and not intended to take restrictively to imply any limitations on the scope of the present disclosure. Unless defined otherwise, all technical and scientific terms used herein have the same meaning as commonly understood to one of ordinary skill in the art to which this disclosure belongs. Although methods and materials similar or equivalent to those described herein can be used in the practice of the disclosed methods and compositions, the exemplary methods, devices and materials are described herein. It is to be understood that this disclosure is not limited to particular methods, and experimental conditions described, as such methods and conditions may apply.

As described previously, there is need in the art for catalyst compositions that are able to provide enhanced efficacy pertaining to resid upgradation. In this regard, the present disclosure provides organometallic compound of Formula I:

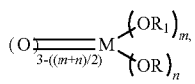

Formula I wherein R is selected from —$C_{1-10}$ alkyl or —$C(O)C_{1-10}$ alkyl; $R_1$ is selected from —$C_{1-10}$ alkyl, —$C(O)C_{1-10}$ alkyl, —$C(O)C_{1-10}$ alkylN$^+$R$_a$R$_b$Cl$^-$, —$C(O)C_{1-10}$ alkylN(CO)R$_a$, —$C_{1-10}$ alkylN$^+$R$_a$R$_b$Cl$^-$, or —$C_{1-10}$ alkylN(CO)R$_a$, wherein R$_a$, and R$_b$ is independently selected from H, $C_{6-12}$ aryl, $C_{1-10}$ alkyl, $C_{6-12}$ aryl, or $C_{1-10}$ alkyl; R, and $R_1$ can be taken together to form a monocyclic 6-8 membered ring; M is selected from Group VI-B metals and m and n is independently 1 to 3. Said compound was found to perform admirably in terms heavy hydrocarbon cracking (such as vacuum resid upgradation). The presence and concentration of OR and $OR_1$ groups provides that compound tunability in terms of decomposition temperature, which is an important factor for improving hydrocarbon cracking efficacy.

Example 1—Synthesis of Organometallic Compound (OM 1)

The solution of molybdic acid (at least one metal precursor; 100 g) and 2-ethyl hexanoic acid (at least one first additive; 100 g) was refluxed at 180° C. for 4 hours to obtain the dark black color salt. The salt was cooled and re dissolved in 150 g of 2-ethyl hexanol (at least one second additive) and heated with reflux at 180° C. for 12 hours to obtain the Mo(O)$_2$(2-ethyl hexanoate)(2-ethyl hexanolate). The Mo percentage from WD-XRF was found to be 14%. Yield: 340 g. The compound was found to be soluble in toluene, kerosene, diesel, base oil.

Example 2—Synthesis of Organometallic Compound (OM 2)

The solution of molybdic acid (at least one metal precursor; 100 g) and 250 g of 2-ethyl hexanol (at least one first additive) and heated with reflux at 180° C. for 12 hours to obtain the Mo(O)$_2$ (2-ethyl hexanolate)$_2$. The Mo percentage from WD-XRF was found to be 14%. Yield: 340 g. The compound was found to be soluble in toluene, kerosene, diesel, base oil. $^1$H NMR (CDCl$_3$, 500 MHz) δ0.86 (m, 6H), 1.24-1.28 (m, 8 H), 1.29 (m, 1H), 3.48 (m, 2H). $^{13}$C NMR (CDCl3, 125 MHz) δ65.30, 42.15, 42.03, 30.18, 23.39, 23.16, 14.14, 13.92, 11.50, 11.23, 11.19, 11.12.

Example 3—Synthesis of Organometallic Compound (OM 3)

The solution of molybdic acid (100 g) and 2-ethyl hexanoic acid (at least one first additive; 250 g) was refluxed at 180° C. for 4 hours to obtain the dark black color Mo(O)$_2$(2-ethyl hexanoate)$_2$. The Mo percentage from WD-XRF was found to be 14%. Yield: 340 g. The compound was found to be soluble in toluene, kerosene, diesel, base oil. $^1$H NMR (CDCl3, 500 MHz) δ0.86 (m, 6H), 1.24-1.64 (m, 9H), 2.27 (m, 2H). $^{13}$C NMR (CDCl3, 125 MHz) δ180.69, 49.11, 47.18, 31.67, 31.54, 29.59, 29.37, 25.62, 25.25, 22.70, 22.31, 13.98, 13.89, 11.82, 11.66.

Example 4—Synthesis of Organometallic Compound (OM 4)

The solution of molybdic acid (100 g) and 2-ethyl hexanoic acid (150 g) was refluxed at 180° C. for 4 hours to obtain the dark black color salt. The salt was cooled and re-dissolved in 100 g of 2-ethyl hexanol and heated with reflux at 180° C. for 12 hours to obtain the Mo(O)$_2$(2-ethyl hexanoate)(2-ethyl hexanolate). The Mo percentage from WD-XRF was found to be 14%. Yield: 340 g. The compound was found to be soluble in toluene, kerosene, diesel, base oil.

Example 5—Synthesis of Organometallic Compound (OM 5)

The solution of molybdic acid (100 g) and 2-ethyl hexanoic acid (150 g) was refluxed for 4 hours to obtain the dark black color salt. The salt was cooled and re dissolved in 100 mL of 2-ethyl hexanol and heated with reflux at 180° C. for 12 hours to obtain the Mo(O)$_2$(2-ethyl hexanoate)(2-ethyl hexanolate). The Mo percentage from WD-XRF was found to be 14%. Yield: 340 g. The compound was found to be soluble in toluene, kerosene, diesel, base oil up to 70% by weight. Up to 7 g the organometallic compound was found to be soluble in 3 g solvent.

Example 6—Synthesis of Organometallic Compound (OM 6)

Figure 2:
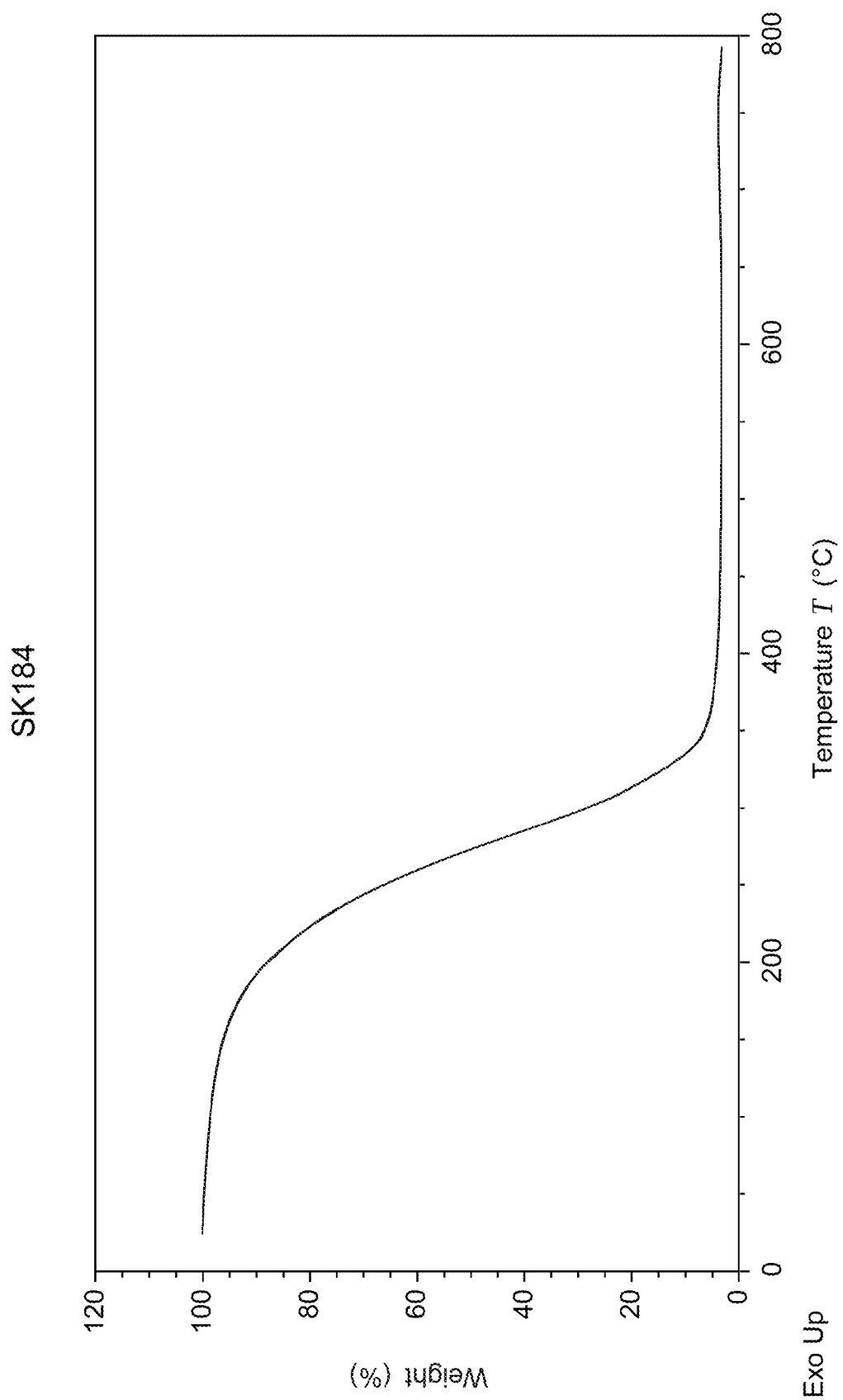
FIG. 2 depicts the thermogravimetric analysis (TGA) spectrum of an organometallic compound, accordance with an implementation of the present subject matter.

To a solution of diethanol amine (10 g) in THF, benzyl chloride (12 g) was added and stirred at 90° C. for 5 hours. The solution changed to light green color. The above compound was heated with molybdic acid (7 g) at 200° C. for 4 hours to obtain the benzyl quaternary ammonium coated moly compounds. Mo percentage 8% by WD-XRF. The reaction scheme is mentioned below in Scheme 1. Color: Dark brown; TGA is given in FIG. 2. $^1$H NMR (CDCl3, 500 MHz) δ2.9 (m, 2H), 4.09 (m, 2H), 7.1-7.28 (m, 5H), $^{13}$C NMR (CDCl3, 125 MHz) δ128.85, 128.76, 128.69, 128.52, 128.41, 126.68, 126.58, 41.08, 38.0.

Example 7—Synthesis of Organometallic Compound (OM 7)

To a solution of diethanol amine (10 g) in THF, benzoyl chloride (12 g) was added and stirred at 0° C. for 5 hours. The solution changed to green color. The above compound was heated with molybdic acid (7 g) at 200° C. for 4 hours to obtain the benzoyl amide coated moly compounds. Mo percentage 8% by WD-XRF. The reaction scheme is mentioned below in Scheme 1.

Scheme 1

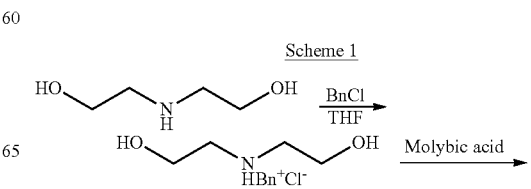

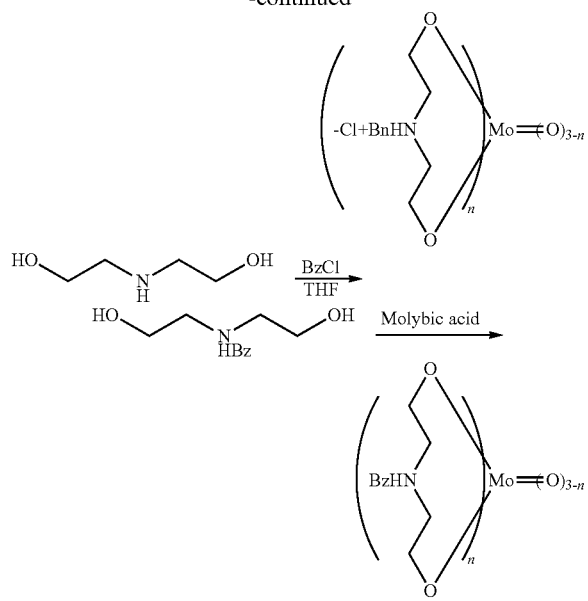

Example 8—Synthesis of Organometallic Compound (OM 8)

To a solution of diethanol amine (10 g), hexyl bromide (12 g) was added and stirred at 140° C. for 5 hours. The above compound was heated with molybdic acid (7 g) at 200° C. for 4 hours to obtain the benzyl quaternary ammonium coated molybdenum compounds. Mo percentage 7.6% by WD-XRF. The reaction scheme is same as in Scheme 1, except the benzyl chloride is replaced with hexyl bromide.

Example 9—Thermogravimetric Analysis of Organometallic Compound

The thermogravimetric analysis (TGA) was carried out for various compounds as described above. The TGA spectra of examples 1 (brown trace), 2 (red trace), 3 (green trace) and 4 (blue trace) has been provided in FIGS. 1 and 2. The decomposition temperature of the organometallic compounds are found to vary with the presence ratio of carboxylate is to alkoxylate present, i.e. decomposition temperature was found to be tunable with the amounts of acid to alcohol ligands employed.

Example 10—Testing of Catalytic Cracking Ability of Organometallic Compound (OM-3)

A strategy was devised to ensure tunable decomposition temperature of the said organometallic compound. It was noted that using carboxylate and alkoxylate moieties as ligands (additives), it was possible to obtain variable decomposition temperatures. Metal carboxylate salts were stable and required high temperatures for decomposition. The molybdenum (Mo) carboxylate compounds were additionally easy to prepare. On the other hand, the Mo alkoxylate compounds were found to decompose at lower temperature. However, the synthesis involves the much longer time in comparison with the carboxylate compounds. Hence, inclusion of alkoxylate ensured lower decomposition, however the synthesis time was found to increase. The ideal balance was attempted between faster synthesis and lower decomposition temperatures. Hence, organometallic compounds were synthesized using this approach via the procedures listed above in Examples 1-7.

The main objective of testing was to establish ability of organometallic compound (OM-3, OM-4 and OM-6) to function as a catalyst. The increase in yields of lighter fraction products by hydrocracking the hydrocarbon residue (boiling point >540° C.; such as vacuum residue) in presence of hydrogen atmosphere was used to establish performance (slurry hydrocracking).

The experiment was conducted in a batch reactor (high temperature high pressure autoclave reactor). In a typical experiment, the reactor was charged with 50 g of hydrocarbon feedstock (vacuum residue) along with organometallic compound (OM-3, OM-4 and OM-6) having a concentration of 10000 ppmw. The reactor was purged with nitrogen to remove any air trapped inside before being pressurized with Hydrogen to 12 MPa. The reaction mixture was heated to 420° C. under vigorous stirring (1000 rpm) to obtain a uniform slurry. After 1 hour of reaction, the products were quenched by circulating chilled water to bring down the temperature below 300° C. rapidly. The gaseous products were collected in a gas bomb and analyzed using gas chromatography for its composition. Similarly, second stage of experiment was conducted with the same reaction conditions as described above for improved quality of products. The liquid products were separated using centrifugation from the solids. The liquid samples were collected and analyzed in GC-SIMDIST as per ASTM D-7169. The data has been listed in Table 1 below.

TABLE 1

Catalytic performance of organometallic compound (OM-3, OM-4, and OM-6) in slurry hydrocracking.

| organometallic compound | Reaction Time | Product Yields | | | Percentage conversion* |
|---|---|---|---|---|---|
| | | Gas | Liquid | Solid | |
| OM-3 | 2 hours | 28.4% | 55.1% | 16.4% | 74.9% |
| OM-4 | 2 hours | 22.9% | 61.8% | 15.26% | 84.7% |
| OM-6 | 2 hours | 20% | 63% | 17% | 83% |

*conversion with respect to hydrocarbon feedstock (boiling point >540° C.)

The conversion of residue (which is a high boiling, high molecular weight, semi-solid product) into lighter hydrocarbons will lead to increase in liquid and gaseous fractions. From the analyses of products, it was observed that the residue fraction in hydrocarbon feedstock (boiling point>540° C.) was converted into lighter hydrocarbons and the maximum conversion achieved was 74.9% after 2 hours reaction time (as described in Table 1). The short time duration provides relatively high conversion, thus highlighting the efficiency of the organometallic compound as a catalyst for cracking hydrocarbon feedstock.

Although the subject matter has been described in considerable detail with reference to certain examples and implementations thereof, other implementations are possible.

Advantages Gained from the Present Disclosure

The present disclosure reveals an organometallic compound of Formula I. The compound can be conveniently synthesized via a process as described herein. The presence of labile alkoxylate ligand and hard/stable carboxylate ligand in the compound ensures tunability of decomposition temperature. The compound was found to perform admirably towards cracking of high boiling hydrocarbon feedstock (>540° C.) via a process as described herein. The compound contributes towards a percentage conversion as high as 85% with respect to lighter fraction products.

We claim:

1. An organometallic compound of Formula: $Mo(O)_2$ (2-ethyl hexanoate)(2-ethyl hexanolate).

2. The organometallic compound as claimed in claim 1, wherein the organometallic compound has a decomposition temperature in a range of 180-400° C.

3. A process for preparation of the organometallic compound as claimed in claim 1, the process comprising: (a) obtaining molybdic acid; (b) contacting the molybdic acid with 2-ethyl hexanoic acid to obtain a first mixture; (c) contacting the first mixture with 2-ethyl hexanol to obtain a second mixture; and (d) processing the first mixture and the second mixture to obtain $Mo(O)_2$ (2-ethyl hexanoate)(2-ethyl hexanolate).

4. The process for preparation of the organometallic compound as claimed in claim 3, wherein contacting the molybdic acid with 2-ethyl hexanoic acid is carried out at a temperature in a range of 150-220° C. for a period in a range of 2-14 hours to obtain the first mixture and contacting the first mixture with 2-ethyl hexanol is carried out at a temperature in a range of 150-220° ° C. for a period in a range of 2-14 hours to obtain the second mixture.

* * * * *